United States Patent
Smadja

[19]

[11] Patent Number: 6,119,114
[45] Date of Patent: *Sep. 12, 2000

[54] METHOD AND APPARATUS FOR DYNAMIC RELEVANCE RANKING

[76] Inventor: Frank Smadja, Tel Manch 6, Haifa 34363, Israel

[ * ] Notice: This patent issued on a continued prosecution application filed under 37 CFR 1.53(d), and is subject to the twenty year patent term provisions of 35 U.S.C. 154(a)(2).

[21] Appl. No.: 08/932,643

[22] Filed: Sep. 17, 1997

Related U.S. Application Data

[60] Provisional application No. 60/026,209, Sep. 17, 1996.

[51] Int. Cl.[7] ............................................. G06F 17/30
[52] U.S. Cl. ............................. 707/7; 707/3; 707/103
[58] Field of Search ............................. 707/5, 4, 3, 103, 707/200, 2, 7; 395/650, 200.33, 200.31

[56] References Cited

U.S. PATENT DOCUMENTS

| | | | |
|---|---|---|---|
| 3,568,155 | 3/1971 | Abraham et al. | 340/172.5 |
| 3,916,387 | 10/1975 | Woodrum | 340/172.5 |
| 4,358,829 | 11/1982 | Branigin et al. | 395/673 |
| 4,522,482 | 6/1985 | Pettigrew et al. | 355/3 R |
| 4,606,002 | 8/1986 | Waisman et al. | 364/200 |
| 4,630,235 | 12/1986 | Hashimoto et al. | 364/900 |
| 4,674,066 | 6/1987 | Kucera | 364/900 |
| 4,849,898 | 7/1989 | Adi | 364/419 |
| 4,864,501 | 9/1989 | Kucera et al. | 364/419 |
| 4,864,502 | 9/1989 | Kucera et al. | 364/419 |
| 4,868,750 | 9/1989 | Kucera et al. | 364/419 |
| 4,942,526 | 7/1990 | Okajima et al. | 364/419 |
| 4,991,087 | 2/1991 | Burkowski et al. | 364/200 |
| 5,099,426 | 3/1992 | Carlgren et al. | 364/419 |
| 5,128,865 | 7/1992 | Sadler | 364/419 |
| 5,151,857 | 9/1992 | Matsui | 364/419 |
| 5,167,011 | 11/1992 | Priest | 395/54 |
| 5,168,565 | 12/1992 | Morita | 395/600 |
| 5,225,981 | 7/1993 | Yokogawa | 364/419 |
| 5,241,674 | 8/1993 | Kuorsawa et al. | 395/600 |
| 5,263,159 | 11/1993 | Mitsui | 395/600 |
| 5,278,980 | 1/1994 | Pedersen et al. | 395/600 |
| 5,297,280 | 3/1994 | Potts et al. | 707/5 |
| 5,303,361 | 4/1994 | Colwell et al. | 707/4 |
| 5,303,367 | 4/1994 | Leenstra, Sr. et al. | 395/600 |
| 5,309,359 | 5/1994 | Katz et al. | 364/419.19 |
| 5,317,507 | 5/1994 | Gallant | 364/419.13 |
| 5,321,608 | 6/1994 | Namba et al. | 364/419.08 |
| 5,321,833 | 6/1994 | Chang et al. | 395/600 |
| 5,325,298 | 6/1994 | Gallant | 364/419.19 |
| 5,331,556 | 7/1994 | Black, Jr. et al. | 364/419.08 |
| 5,369,577 | 11/1994 | Kadashevich et al. | 364/419.13 |
| 5,375,233 | 12/1994 | Kimber et al. | 395/600 |
| 5,377,354 | 12/1994 | Scannell et al. | 395/650 |
| 5,383,120 | 1/1995 | Zernik | 364/419.08 |
| 5,404,295 | 4/1995 | Katz et al. | 364/419.19 |

(List continued on next page.)

OTHER PUBLICATIONS

Maarek, Y.S., et al., "Full Text Indexing Based on Lexical Relations. An Application: Software Libraries", *Proceedings of the 12th Annual International ACM SIGIR Conference on Research and Development in Information Retrieval*, ACM Press, 198–206 (1989).

Salton, G., *Automatic Text Processing*, Addison–Wesley Publishing Company, Reading, MA, 229–312 (1989).

Smadja, F., "Retrieving Collocations from Test: Xtract", *Computational Linguistics*, 19, 143–178 (Mar. 1993).

Smadja, F., "Xtract: An Overview", *Computers and the Humanities*, 26, 399–413 (1993).

Primary Examiner—Thomas G. Black
Assistant Examiner—Frantz Coby

[57] ABSTRACT

The present invention provides a method and apparatus for implementing dynamic relevance ranking. The method includes the step of registering a profile. A newly received document is dynamically filtered with the profile. Registration is performed by entering the profile, and searching training data in accordance with the profile. The training data is searched by determining the relevance score of documents in the training data. The documents in the training data are ranked to form a list. The least relevant document in the list is specified.

33 Claims, 5 Drawing Sheets

U.S. PATENT DOCUMENTS

| | | | |
|---|---|---|---|
| 5,406,480 | 4/1995 | Kanno | 364/419.08 |
| 5,408,600 | 4/1995 | Garfinkel et al. | 345/329 |
| 5,440,481 | 8/1995 | Kostoff et al. | 364/419.08 |
| 5,444,842 | 8/1995 | Bentson et al. | 395/161 |
| 5,450,580 | 9/1995 | Takada et al. | 395/600 |
| 5,454,096 | 9/1995 | Otsuka et al. | 395/401 |
| 5,490,274 | 2/1996 | Zbikowski et al. | 395/700 |
| 5,513,126 | 4/1996 | Harkins et al. | 364/514 A |
| 5,530,852 | 6/1996 | Meske, Jr. et al. | 395/600 |
| 5,530,853 | 6/1996 | Schell et al. | 707/103 |
| 5,535,121 | 7/1996 | Roche et al. | 364/419.08 |
| 5,535,382 | 7/1996 | Ogawa | 395/600 |
| 5,537,317 | 7/1996 | Schabes et al. | 364/419.08 |
| 5,537,589 | 7/1996 | Dalal | 395/600 |
| 5,539,665 | 7/1996 | Lamming et al. | 364/514 R |
| 5,541,836 | 7/1996 | Church et al. | 364/419.07 |
| 5,542,090 | 7/1996 | Henderson et al. | 395/600 |
| 5,544,049 | 8/1996 | Henderson et al. | 364/419.19 |
| 5,546,578 | 8/1996 | Takada | 395/600 |
| 5,550,965 | 8/1996 | Gabbe et al. | 395/154 |
| 5,555,403 | 9/1996 | Cambot et al. | 707/4 |
| 5,555,409 | 9/1996 | Leenstra, Sr. et al. | 395/600 |
| 5,560,007 | 9/1996 | Thai | 395/600 |
| 5,566,302 | 10/1996 | Khalidi et al. | 395/200.09 |
| 5,577,243 | 11/1996 | Sherwood et al. | 395/607 |
| 5,588,138 | 12/1996 | Bai et al. | 395/497.04 |
| 5,594,837 | 1/1997 | Noyes | 395/63 |
| 5,608,623 | 3/1997 | Sata et al. | 395/754 |
| 5,608,904 | 3/1997 | Chaudhuri et al. | 395/602 |
| 5,610,812 | 3/1997 | Schabes et al. | 395/759 |
| 5,613,034 | 3/1997 | Ney et al. | 395/2.6 |
| 5,613,108 | 3/1997 | Morikawa | 707/200 |
| 5,625,751 | 4/1997 | Brandwajn et al. | 706/20 |
| 5,659,732 | 8/1997 | Kirsch | 395/605 |
| 5,724,567 | 3/1998 | Rose et al. | 707/2 |
| 5,754,938 | 5/1998 | Herz et al. | 455/4.2 |
| 5,754,939 | 5/1998 | Herz et al. | 455/4.2 |
| 5,765,170 | 6/1998 | Morikawa | 707/200 |
| 5,832,218 | 11/1998 | Gibbs et al. | 395/200.33 |
| 5,862,325 | 1/1999 | Reed et al. | 395/200.31 |

METHOD AND APPARATUS FOR DYNAMIC RELEVANCE RANKING

RELATED APPLICATION

This application claims the benefit of U.S. Provisional Application No. 60/026,209, filed Sep. 17, 1996.

A portion of this disclosure of this patent document contains material which is subject to copyright protection. The copyright owner has no objection to the facsimile reproduction by anyone of the patent disclosure, as it appears in the Patent and Trademark Office files or records, but otherwise reserves all copyrights whatsoever.

FIELD OF THE INVENTION

The present invention relates generally to electronic technology, and more specifically to information technology.

BACKGROUND OF THE INVENTION

A wealth of information is available to computer users with the advent of modern technologies, including the Internet. For example, the users can automatically receive a continuous stream of information, such as documents. The documents may be electronic mail (E-mail) or news wires. However, the users may be overwhelmed with volumes of documents.

Therefore, the users can filter the documents, so that they only receive documents that are relevant to them. Filters are implemented with profiles, in which users describe their interests using natural language. A computer, using a profile, analyzes received documents, and determines whether any of the documents are relevant, and should therefore be presented, to the user.

Two types of filtering techniques have been developed to ascertain relevant information. The first technique is known as batch filtering. With batch filtering, a computer utilizes the profile to periodically analyze received documents. This technique ascertains whether any of the received documents are relevant, and also ranks the documents according to their relative relevance. As a result, this technique provides the user with a list of relevant documents ranked, or ordered, by relative relevance. Therefore, the user can more readily determine which documents to review.

However, this technique is computationally and memory intensive. In part, this is so because this technique requires on the order of Nlog(N) steps, where N is the number of documents in the list. Also, this technique cannot analyze received documents dynamically. Therefore, the user must wait for periodic batch filtering before receiving relevant documents.

The second technique is dynamic. Thus, the user is presented with a relevant document upon its receipt. However, unlike batch filtering, the second technique does not rank documents according to relative relevance. Rather, the second technique only determines whether a document is determined to be relevant or non-relevant based upon the presence or absence of keywords included in the profile. Therefore, there is a need to provide a user with dynamic relevance ranking of documents.

SUMMARY OF THE INVENTION

The present invention solves the above-mentioned problems in the art and other problems which will be understood by those skilled in the art upon reading and understanding the present specification. The present invention provides a method and apparatus for implementing dynamic relevance ranking.

The method includes the step of registering a profile. A newly received document is dynamically filtered with the profile. In one embodiment, registration is performed by entering the profile, and searching training data in accordance with the profile. In another embodiment, the training data is searched by determining the relevance score of documents in the training data. The documents in the training data are ranked to form a list. The least relevant document in the list is specified.

In yet another embodiment, the dynamic filtering is performed by determining the relevance score of the newly received document. The newly received document is determined to be relevant by comparing relevance scores of the newly received document and the least relevant document.

The apparatus for implementing dynamic relevance ranking may include a computer program product or a computer system. The computer program product may include a registration process enabling a processor to register a profile. A dynamic filtering process enables the processor to dynamically filter a newly received document with the profile. In one embodiment, the computer program product includes a searching process enabling the processor to search training data in accordance with the profile. In yet another embodiment, the searching process includes a determining process enabling the processor to determine the relevance score of documents in the training data. A ranking process enables the processor to rank the documents in the training data to form a list. The computer system, may include, in addition to the features of the computer program product, a computer including, a processor operatively coupled to a memory.

It is a benefit of the present invention that it ascertains and ranks the relevance of a document in real time based upon a user's profile. It is an advantage of the present invention that it permits ranking the relevance of documents in a less computationally and memory intensive manner than conventional techniques. It is a feature of the present invention that the precision with which the invention ranks relevance of a newly received document improves as more documents are ranked. Further features and advantages of the present invention, as well as the structure and operation of various embodiments of the present invention, are described in detail below with reference to the accompanying drawings.

DETAILED DESCRIPTION OF THE EMBODIMENTS

In the following detailed description of the preferred embodiments, reference is made to the accompanying drawings which form a part hereof, and in which is shown by way of illustration specific preferred embodiments in which the invention may be practiced. These embodiments are described in sufficient detail to enable persons skilled in the art to practice the invention, and it is to be understood that other embodiments may be utilized and that logical, mechanical and electrical changes may be made without departing from the scope of the present invention. The following detailed description is, therefore, not to be taken in a limiting sense.

The present invention provides a method and apparatus for dynamic relevance ranking. The invention ascertains and ranks the relevance of a document in substantially real time based upon a user's profile.

Figure 1:
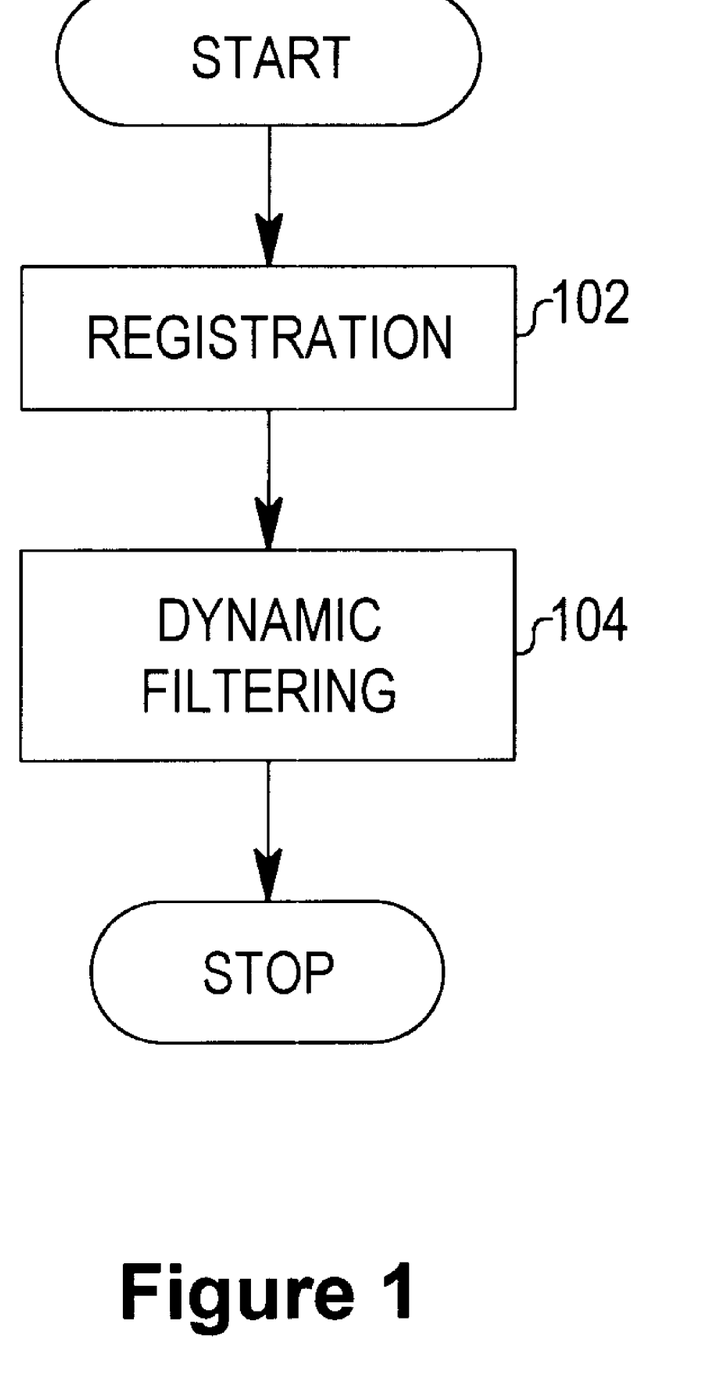
FIG. 1 is a flow chart of one embodiment of the present invention.
Figure 2:
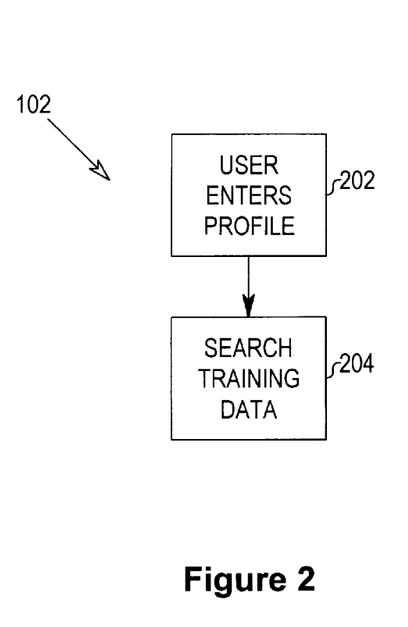
FIG. 2 is a flow chart of another embodiment of the present invention.
Figure 3:
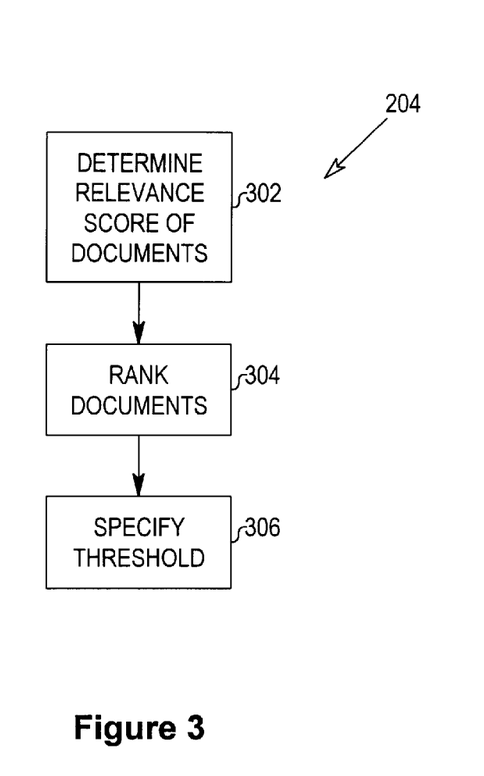
FIG. 3 is a flow chart of yet another embodiment of the present invention.

One embodiment of the present invention includes a method comprising two steps, registration (step 102) and dynamic filtering (step 104), as illustrated in FIG. 1. During registration (step 102), the user enters a profile (step 202), as illustrated in FIG. 2. A corpus of training data is then searched in accordance with the profile (step 204). The training data, for example, may include previously received E-mail or other documents. The relevance score of each document is determined with respect to the profile (step 302) during searching (step 204), as illustrated in FIG. 3. The relevance score is a real number. Typically, the higher the relevance score, the more relevant the document. The documents are ranked, or sorted, in order of their relevance, in a list, LR(profile) (step 304) during searching (step 204). The list may be stored in memory, as described below. Then, the user specifies a threshold of relevance, or threshold(profile), (step 306) which is the least relevant document.

Figure 4:
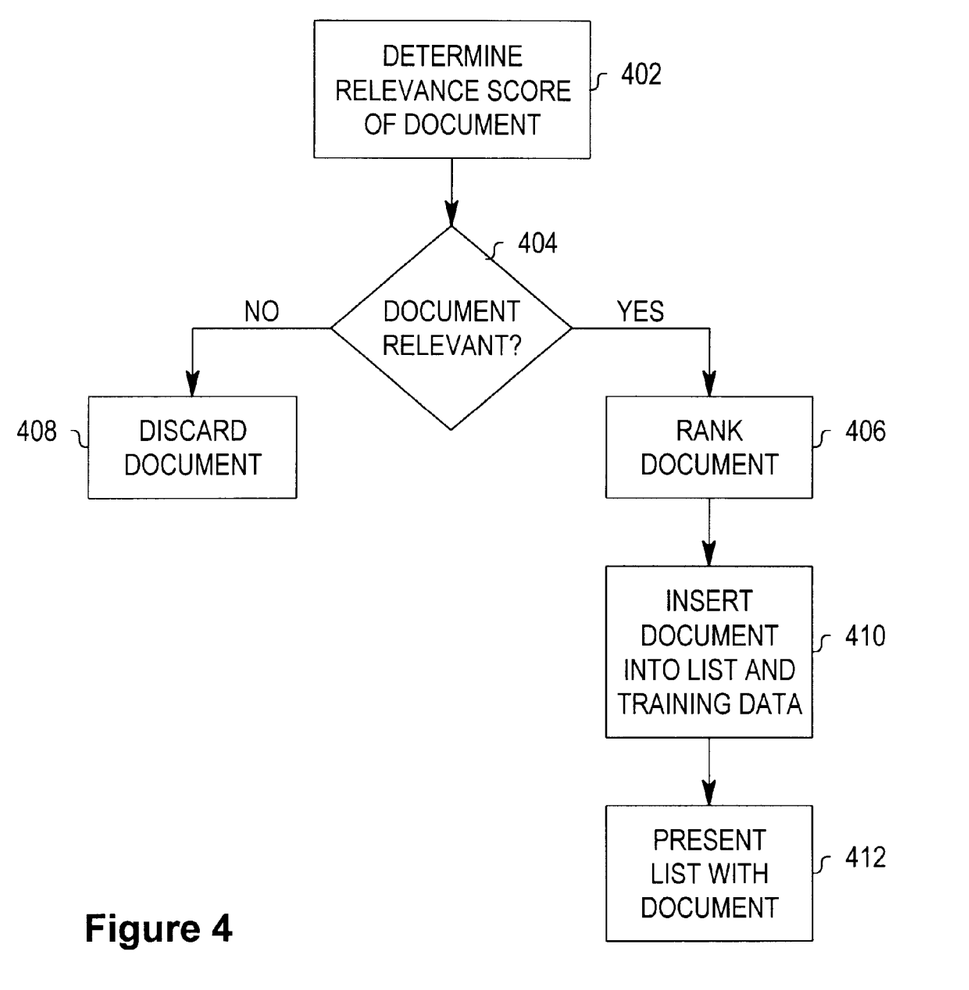
FIG. 4 is a flow chart of yet another embodiment of the present invention.

Upon completion of registration (step 102), dynamic filtering (step 104) can commence. During dynamic filtering (step 104), the present invention determines the relevance score of a newly received document with respect to the profile (step 402). Then, the present invention determines whether the newly received document is relevant (step 404). Relevance is ascertained by comparing the relevance scores of the newly received document and the least relevant document. If the score of the newly received document is greater than or equal to the relevance score of the least relevant document, then the newly received document is deemed relevant with respect to the profile. Otherwise the newly received document is deemed irrelevant, and is discarded (step 408).

If the newly received document is deemed relevant (step 404), the rank of the newly received document is determined by comparing its relevance score with the relevance score of the documents in the list, LR profile) (step 406). The list is stored as a binary tree. Once the rank of the newly received document is determined (step 406), the newly received document is inserted into the list, in accordance with its rank, and the training data (step 410). A list of the relevant documents, including the newly received document ordered by relevance ranking, is then presented to the user (step 412).

Figure 5:
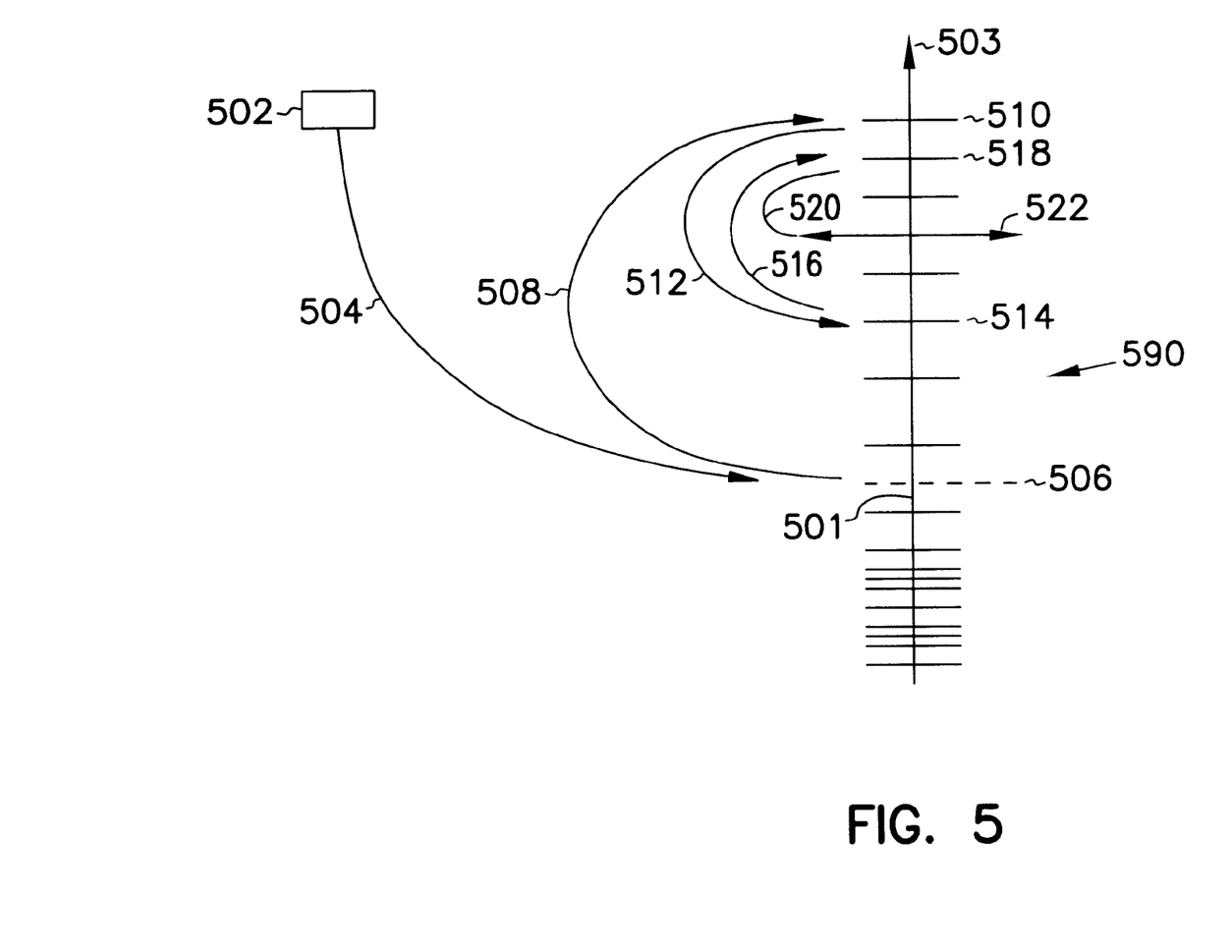
FIG. 5 is an illustration of an exemplary binary search.

FIG. 5 illustrates one embodiment of rank determination (step 406), a binary search 590. The binary search 590 requires no more than log(N) steps, where N is the number of documents in the list. Thus, this technique is more efficient than other methods described above.

One embodiment of a binary search 590 will now be exemplified. First, the relevance score 503 of the newly received document 502 is compared (step 504) to the relevance score of the least relevant document 506 in the list 501. The newly received document 502 is determined to have a higher relevance score than the least relevant document 506. The newly received document 502 is then compared (step 508) to a most relevant document 510 in the list 501.

The newly received document 502 is determined to have a lower relevance score than the most relevant document 510. The newly received document 502 is then compared (step 512) with a third document 514 having a relevance score proximate to the statistical average of the relevance scores of lower and upper bounds, which in this case are respectively the least and most relevant documents 506, 510. The statistical average, for example, may be either the mean or median relevance scores between lower and upper bounds.

The newly received document 502 is determined to have a higher relevance score than the third document 514. The newly received document 502 is then compared (step 516) with a fourth document 518 having a relevance score proximate to the statistical average of the relevance scores of the upper and lower bounds, which in this case are respectively the most relevant and the third documents 510, 514. This technique is repeated until the rank of the newly received document 502 is determined (step 406) by uncovering two adjacent documents in the list 501 that have relevance scores that are respectively higher and lower than the relevance score of the newly received document 502. Then, the newly received document 502 is inserted (steps 410, 520) into the list 501 at a position 522 between the two documents.

Figure 6:
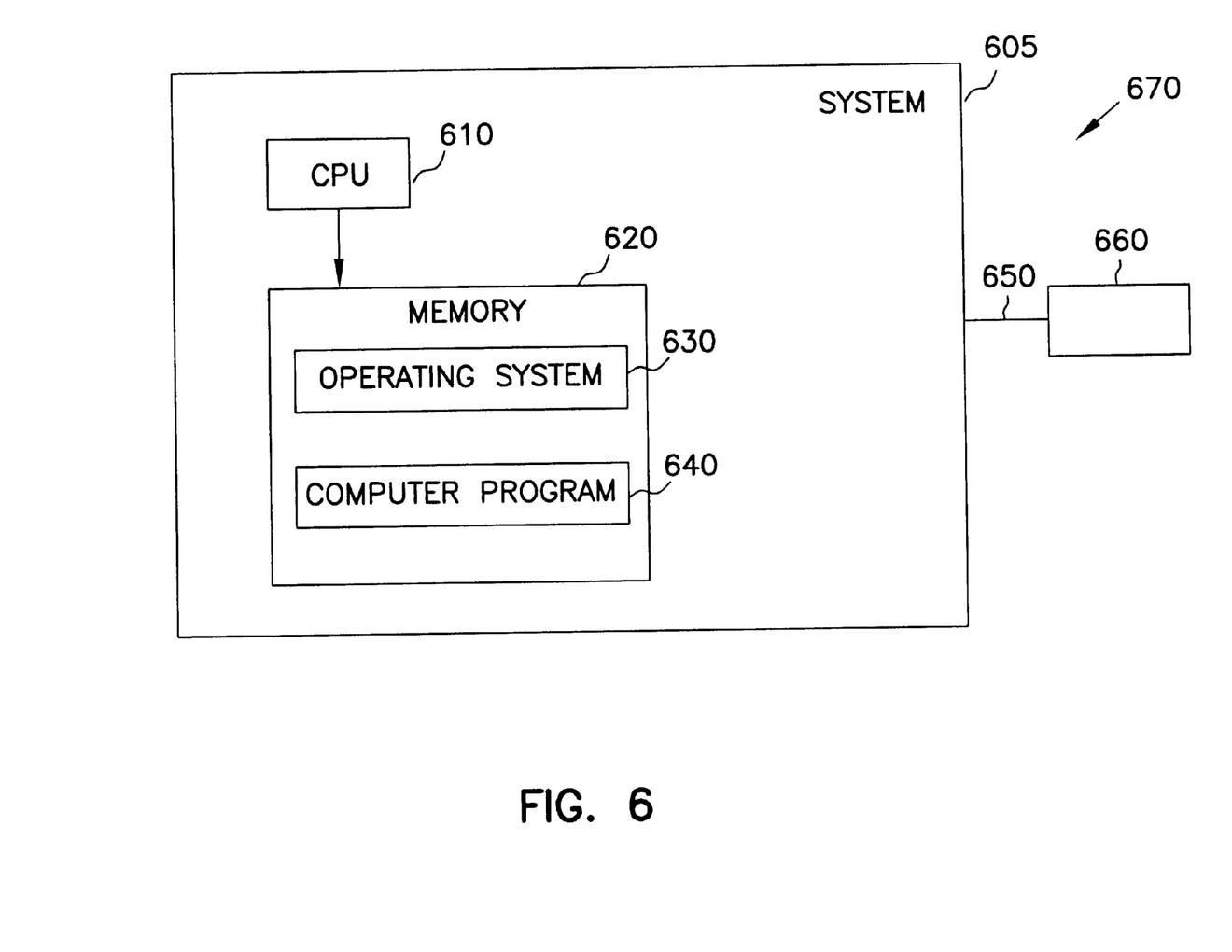
FIG. 6 is a block diagram of one embodiment of a computer system.

The method described above may be implemented as a computer program. The computer program may be executed on a computer. FIG. 6 illustrates an exemplary computer 605 in which the computer program 640 may reside and be executed. The computer 605 may be any processing system for executing the computer program 640, including, but not limited to, personal and main frame computers.

The computer 605 may include a central processing unit 610 and memory 620. The processing unit 610 may be, but is not limited to, a Pentium microprocessor by Intel Corporation (Santa Clara, Calif.). The memory 620 can be random access memory, disk storage, CD-ROM storage, digital video, or versatile, disk (DVD), another type of memory or combinations thereof. Within the memory 620, the computer 605 has access to its operating system 630 and the computer program 640. Exemplary pseudocode for implementing the present invention as a computer program 640 is illustrated below in Tables 1 through 3.

The computer 605 may be part of a computer system 670, such as a computer network. The computer system 670 may be the Internet, a wide area network, a local area network, or a portion or combination thereof. The computer system 670 may include a second computer 660 coupled to the computer 605. The computer 650 and second computer 660 are coupled by a communications system 650 formed by a wireline system, wireless system, or combination thereof.

The computer 605 and the second computer 660 may have comparable functions and/or structures. Alternatively, the computer 605 and the second computer 660 may have dissimilar functions and/or structures, for example, respectively being a server and a client in a computer network 670 that is a client-server network. The method described above may be substantially or completely performed on the server, while the results, such as the documents ranked by relevance, are presented to a user through the client.

CONCLUSION

The present invention provides a method and apparatus for dynamic relevance ranking. The invention ascertains and ranks the relevance of a document in real time based upon a user's profile. The present invention permits ranking the relevance of documents in a less computationally and memory intensive manner than conventional techniques. It is also an advantage of the present invention that the precision with which the invention ranks relevance of a newly received document improves as more documents are ranked. It is a further benefit of the present invention that the ranking is performed efficiently.

It is understood that the above description is intended to be illustrative, and not restrictive. Many embodiments will be apparent to those skilled in the art upon reviewing the above description. For example, other implementations of computers, using state machines, parallel processors, or combinations thereof, may be utilized. Hence, the scope of the invention should, therefore, be determined with reference to the appended claims, along with the full scope of equivalents to which such claims are entitled.

TABLE 1

Copyright ASAP, Ltd.
PSEUDOCODE

```
/* The main function, receives a document and clips it according to users profiles.
articleref is the document id, body is the full text, headline is the headline. */
Clip_Document(char articleref[ ], char body [ ], char headline[ ])
{
    /*  stem the document, i.e., analyzes all the words in it remove closed class
        words and perform morphological analysis if necessary. */
    Stem_One_Document (headline, body, stemmed_document);
    /*  clip it now */
    Clip_Stemmed_Document(articleref, headline, stemmed_document);
}
```

TABLE 2

Copyright ASAP, Ltd.

```
/* Actual clipping of the document */
Clip_Stemmed_Document(articleref, headline, stemmed_document)
{
    /*  Analyzes all the users' profiles and retrieve those with a match with the
        given document. Store them in the List_Of_Potential_Profiles */
    Find_List_Of_Potential_Profiles(stemmed_document,
    List_Of_Potential_Profiles);
    For Each (Profile in List_Of_Potential_Profiles)
    {
        /*  We retrieve the reference list for the profile. I.e., all the relevant
            documents we have already seen. */
        Retrieve_Reference_List(Profile, Reference_List);
        /*  We compute the scores of the least relevant document already seen:
            cutoffscore and the score of the most relevant document already seen:
            maxscore */
        Compute_Threshold_And_Maximum_Score(Profile, Reference_List,
        &cutoffscore, &maxscore);
        /*  We compute the score of the current document compared with the
            profile */
        Compute_Current_Document_Score(stemmed_document, Profile,
        &score);
        /*  If the score does not pass the threshold we move on to another
            profile */
        if (score<cutoffscore)
            continue;
        else
        {
            /*  We find the rank of the current document */
            Find_Current_Document_Rank(Reference_List score, &rank);
            /*  We insert it at the right place */
            Insert_Current_Document_In_Reference_List(articleref,
            Reference_List rank);
            continue;
            /*  We alert the user */
            Alert_User(profile, articleref, rank);
}}}
```

TABLE 3

Copyright ASAP, Ltd.

```
/*  Function to find the rank of the current document. Based on a binary tree
    comparison */
Find_Current_Document_Rank(Reference_List score, &rank)
{
    int mid, lb=0, ub=0, result;
    ub = total size of Reference List;
    while (ub >= lb)
    {
        /*  We compare the score of the document in position mid from the
            reference list with the score of the current document */
        result = Compute_Score(Reference_List[mid = (ub + lb)/2]);
        /*  If both scores are equal, we return it */
        if (score == result)
            return (mid);
        else if (score < result)
            ub = mid - 1;
        else if (score > result)
            lb = mid + 1;
    }
    return lb;
}
```

I claim:

1. In a computer system, a method for providing a user with newly-received documents having a selected range of relevance, said method comprising the computer-implemented steps of:

providing a first set of training data having plurality of training documents, said first set of training data having a first collective absolute relevance indicative of an extent to which said plurality of training documents includes preferred content;

specifying a relative relevance threshold indicative of a relevance of desired newly-received documents relative to said first collective absolute relevance;

selecting, for said first set of training data, a selected range bounded by an absolute-relevance threshold corresponding to said relative relevance threshold;

determining whether a newly-received document has an absolute-relevance score within said range, said absolute relevance score being indicative of an extent to which said newly-received document includes preferred content.

2. The method of claim 1 further comprising the step of generating a user-profile indicative of said preferred content.

3. The method of claim 1 further comprising the step of determining, on the basis of said absolute-relevance score of said newly-received document and said first collective absolute relevance, whether to replace said first set of training data by a second set of training data formed by adding said newly-received document to said first set of training data.

4. The method of claim 3 wherein the step of determining whether to replace said first set of training data further comprises the steps of:

evaluating an absolute relevance for said newly-received document;

selecting, on the basis of said relative relevance threshold, a first training document to be a least-relevant document;

determining whether said newly-received document has a higher absolute relevance score than said least-relevant document;

if said newly-received document has a higher absolute relevance score than said least-relevant document, replacing said first set of training data with a second set of training data formed by incorporating said newly-received document into said plurality of training documents; and selecting, on the basis of said relative-relevance threshold, a second training document from said second set of training data to be said least-relevant document, said second training document having a higher absolute relevance score than said first training document;

whereby successive newly-received documents require progressively higher absolute relevance scores to surpass said relative relevance threshold.

5. The method of claim 3 wherein said step of determining whether to replace said first set of training data comprises the step of including said newly-received document in said first set of training data to create a second set of training data having a second collective absolute relevance higher than said first collective absolute relevance.

6. The method of claim 5, wherein said step of selecting a first training document to be a least-relevant document comprises the steps of:

determining an absolute relevance score of each of said plurality of training documents in said first set of training data, each absolute relevance score being indicative of an extent to which said training document includes preferred content;

sorting said plurality of training documents in said first set of training data on the basis of their absolute relevance scores to form a sorted list; and specifying a least relevant training document in said sorted list.

7. The method of claim 6, further comprising the steps of:

determining, on the basis of said absolute relevance score of said newly-received document and said absolute relevance scores of each of said plurality of training documents, a rank of said newly-received document relative to each of said plurality of training documents; and inserting said newly-received document into said sorted list according to said rank.

8. The method of claim 7, further comprising the step of presenting said sorted list of relevant documents, including said newly-received document, to a user.

9. The method of claim 7, wherein said step of determining said rank comprises the step of performing a binary search on said plurality of training documents to determine a first training document and a second training document having absolute relevance scores above and below said absolute relevance score of said newly-received document.

10. The method of claim 9, wherein said sorted list includes a most relevant document having an absolute relevance score higher than said absolute relevance scores of all other training documents in said sorted list and a least relevant document having an absolute relevance score lower than said absolute relevance scores of all other training documents in said sorted list, and wherein said step of performing a binary search comprises the step of comparing said absolute relevance score of said newly-received document with a statistical average of said absolute relevance scores of said most relevant document and said least relevant document.

11. The method of claim 10, wherein said comparing step comprises the step of comparing said absolute relevance score of said newly-received document with an absolute relevance score proximate to said statistical average of said absolute relevance scores of said most relevant document and said least relevant document.

12. A computer-readable medium having, encoded thereon, software for providing a user with newly-received documents having a selected range of relevance, said software comprising instructions for executing the steps of:

providing a first set of training data having plurality of training documents, said first set of training data having a first collective absolute relevance indicative of an extent to which said plurality of training documents includes preferred content;

specifying a relative relevance threshold indicative of a relevance of desired newly-received documents relative to said first collective absolute relevance;

selecting, for said first set of training data, a selected range bounded by an absolute-relevance threshold corresponding to said relative relevance threshold;

determining whether a newly-received document has an absolute-relevance score within said range, said absolute relevance score being indicative of an extent to which said newly-received document includes preferred content.

13. The computer-readable medium of claim 12 wherein said instructions further comprise instructions for executing the step of generating a user-profile indicative of said preferred content.

14. The computer-readable medium of claim 12 wherein said instructions further comprise instructions for executing the step of determining, on the basis of said absolute-relevance score of said newly-received document and said first collective absolute relevance, whether to replace said first set of training data by a second set of training data formed by adding said newly-received document to said first set of training data.

15. The computer-readable medium of claim 14 wherein said instructions for executing said step of determining whether to replace said first set of training data comprise instructions for executing the step of including said newly-received document in said first set of training data to create a second set of training data having a second collective absolute relevance higher than said first collective absolute relevance.

16. The computer-readable medium of claim 14 wherein said instructions for executing said step of determining whether to replace said first set of training data further comprise instructions for executing the steps of:

evaluating an absolute relevance for said newly-received document;

selecting, on the basis of said relative relevance threshold, a first training document to be a least-relevant document;

determining whether said newly-received document has a higher absolute relevance score than said least-relevant document;

if said newly-received document has a higher absolute relevance score than said least-relevant document, replacing said first set of training data with a second set of training data formed by incorporating said newly-received document into said plurality of training documents; and selecting, on the basis of said relative-relevance threshold, a second training document from said second set of training data to be said least-relevant document, said second training document having a higher absolute relevance score than said first training document;

whereby successive newly-received documents require progressively higher absolute relevance scores to surpass said relative relevance threshold.

17. The computer-readable medium of claim 16, wherein said instructions for executing the step of selecting a first training document to be a least-relevant document comprise instructions for executing the steps of:

determining an absolute relevance score of each of said plurality of training documents in said first set of training data, each absolute relevance score being indicative of an extent to which said training document includes preferred content;

sorting said plurality of training documents in said first set of training data on the basis of their absolute relevance scores to form a sorted list; and specifying a least relevant training document in said sorted list.

18. The computer-readable medium of claim 17, wherein said sorted list includes a most relevant document having an absolute relevance score higher than said absolute relevance scores of all other training documents in said sorted list and a least relevant document having an absolute relevance score lower than said absolute relevance scores of all other training documents in said sorted list, and wherein said step of performing a binary search comprises the step of comparing said absolute relevance score of said newly-received document with a statistical average of said absolute relevance scores of said most relevant document and said least relevant document.

19. The computer-readable medium of claim 18, wherein said instructions for executing said comparing step comprise instructions for executing the step of comparing said absolute relevance score of said newly-received document with an absolute relevance score proximate to said statistical average of said absolute relevance scores of said most relevant document and said least relevant document.

20. The computer-readable medium of claim 17, wherein said software further comprises instructions for executing the steps of:

determining, on the basis of said absolute relevance score of said newly-received document and said absolute relevance scores of each of said plurality of training documents, a rank of said newly-received document relative to each of said plurality of training documents; and inserting said newly-received document into said sorted list according to said rank.

21. The computer-readable medium of claim 20, wherein said instructions further comprise instructions for executing the step of presenting said sorted list of relevant documents, including said newly-received document, to a user.

22. The computer-readable medium of claim 20, wherein said instructions for executing said step of determining said rank comprise instructions for executing the step of performing a binary search on said plurality of training documents to determine a first training document and a second training document having absolute relevance scores above and below said absolute relevance score of said newly-received document.

23. A computer system for providing a user with newly-received documents having a selected range of relevance, said system comprising:

a computer-readable representation of a first set of training data having a plurality of training documents, said first set of training data having a first collective absolute relevance indicative of an extent to which said plurality of training documents includes preferred content;

means for specifying a relative relevance threshold indicative of a relevance of desired newly-received documents relative to said first collective absolute relevance;

selection means for selecting, for said first set of training data, a selected range bounded by an absolute-relevance threshold corresponding to said relative relevance threshold;

means for determining whether a newly-received document has an absolute-relevance score within said range, said absolute relevance score being indicative of an extent to which said newly-received document includes preferred content.

24. The system of claim 23 further comprising means for generating a user-profile indicative of said preferred content.

25. The system of claim 23 further comprising:

means for determining, on the basis of said absolute-relevance score of said newly-received document and said first collective absolute relevance, whether to replace said first set of training data by a second set of training data formed by adding said newly-received document to said first set of training data.

26. The system of claim 25 wherein said means for determining whether to replace said first set of training data comprises means for including said newly-received document in said first set of training data to create a second set of training data having a second collective absolute relevance higher than said first collective absolute relevance.

27. The system of claim 25 wherein said means for determining whether to replace said first set of training data further comprises:

relevance-evaluation means for evaluating an absolute relevance for said newly-received document;

means for selecting, on the basis of said relative relevance threshold, a first training document to be a least-relevant document;

means for determining whether said newly-received document has a higher absolute relevance score than said least-relevant document;

means for replacing said first set of training data with a second set of training data formed by incorporating said newly-received document into said plurality of training documents; and means for selecting, on the basis of said relative-relevance threshold, a second training document from said second set of training data to be said least-relevant document, said second training document having a higher absolute relevance score than said first training document.

28. The system of claim 27, wherein said means for selecting a first training document to be a least-relevant document comprises:

scoring means for determining an absolute relevance score of each of said plurality of training documents in said first set of training data, each absolute relevance score being indicative of an extent to which said training document includes preferred content;

sorting means for sorting said plurality of training documents in said first set of training data on the basis of their absolute relevance scores to form a sorted list; and means for specifying a least relevant training document in said sorted list.

29. The system of claim 28, further comprising:

ranking means for determining, on the basis of said absolute relevance score of said newly-received document and said absolute relevance scores of each of said plurality of training documents, a rank of said newly-received document relative to each of said plurality of training documents; and inserting said newly-received document into said sorted list according to said rank.

30. The system of claim 29, further comprising display means for presenting said sorted list of relevant documents, including said newly-received document, to a user.

31. The system of claim 29, wherein said ranking means comprises binary search means for identifying a first training document and a second training document having absolute relevance scores above and below said absolute relevance score of said newly-received document.

32. The system of claim 31, wherein said sorted list includes a most relevant document having an absolute relevance score higher than said absolute relevance scores of all other training documents in said sorted list and a least relevant document having an absolute relevance score lower than said absolute relevance scores of all other training documents in said sorted list, and wherein said binary search means comprises comparison means for comparing said absolute relevance score of said newly-received document with a statistical average of said absolute relevance scores of said most relevant document and said least relevant document.

33. The system of claim 32, wherein said comparison means comprises means for comparing said absolute relevance score of said newly-received document with an absolute relevance score proximate to said statistical average of said absolute relevance scores of said most relevant document and said least relevant document.

* * * * *